United States Patent Office 3,625,112
Patented Dec. 7, 1971

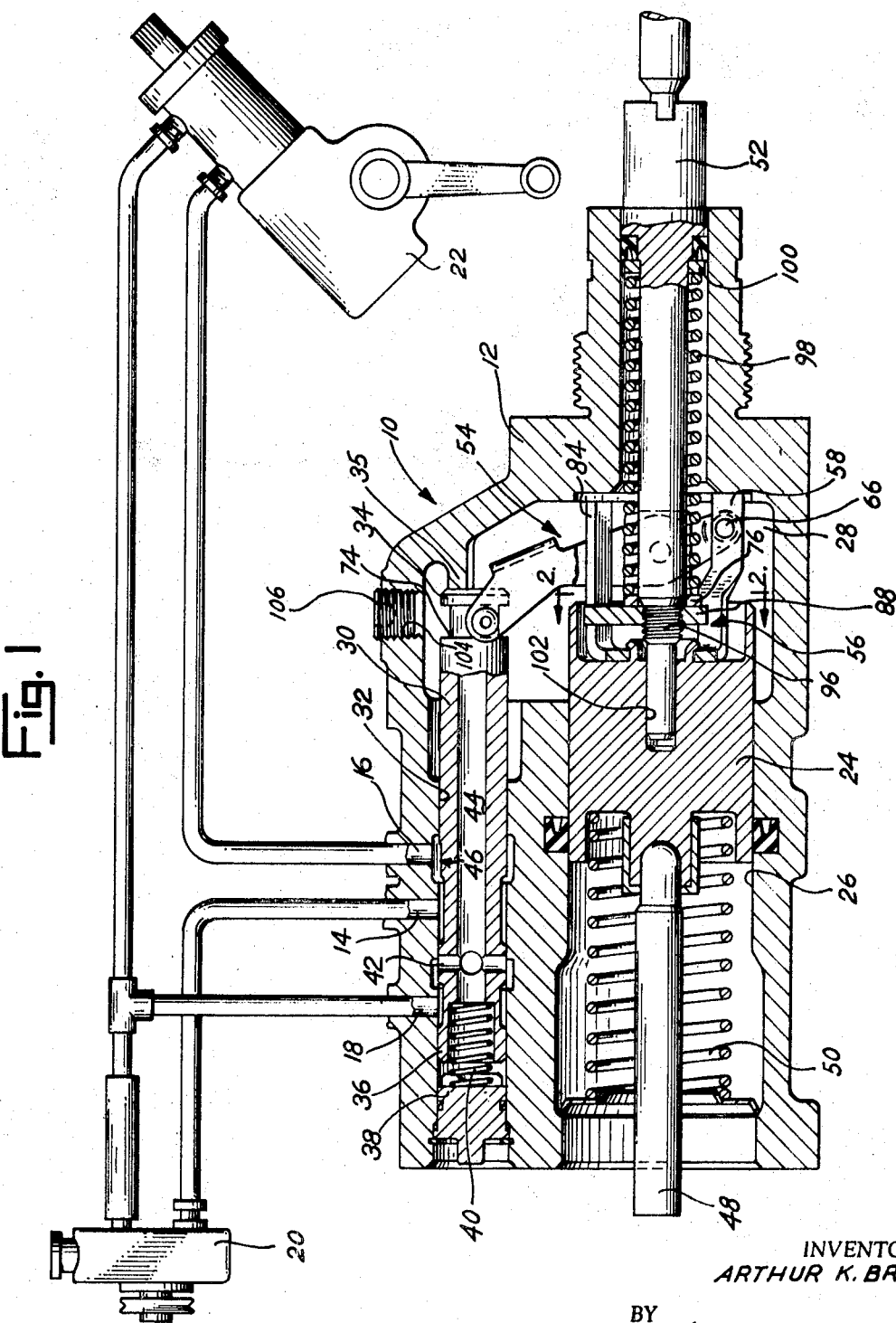

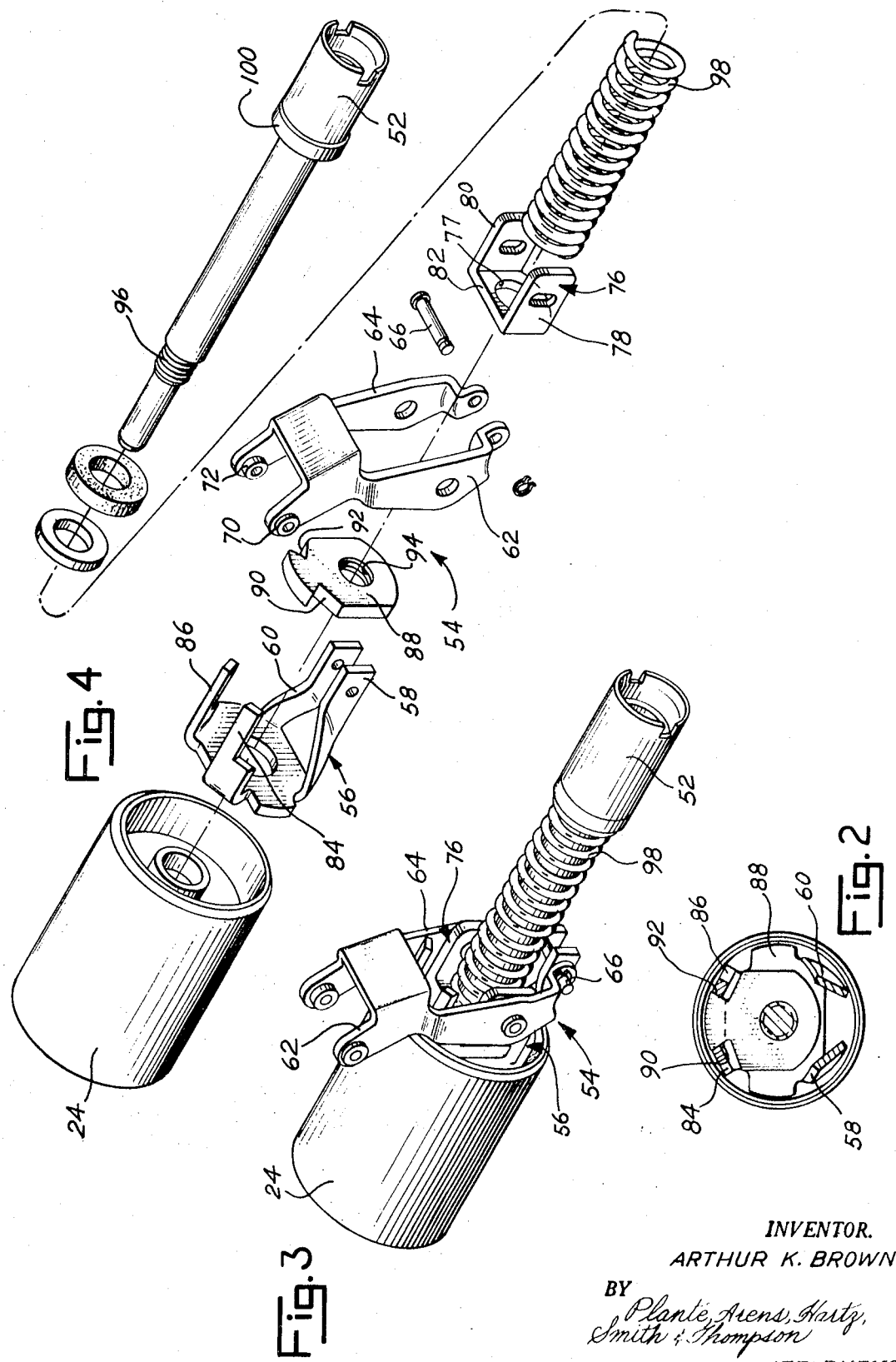

3,625,112
HYDRAULIC BRAKE BOOSTER BLIND ASSEMBLY
Arthur K. Brown, South Bend, Ind., assignor to
The Bendix Corporation
Filed Feb. 25, 1970, Ser. No. 14,133
Int. Cl. F15b 13/10
U.S. Cl. 91—391
6 Claims

ABSTRACT OF THE DISCLOSURE

A hydraulic boost device is disclosed which includes a housing defining a stepped bore having larger and smaller diameter sections. Valve means are provided in the housing to control communication of the bore with a source of pressurized fluid. A pair of valve-operating levers are pivotally mounted on the piston and interconnect the lever with the valve means and with a plunger operated by the vehicle operator. The plunger extends through an aperture in a plate that is pivotally mounted on the levers. A resilient member urges the plate into engagement with an abutment on the plunger. This construction facilitates assembly of the device, since the levers may be mounted on the piston before the latter is inserted into the housing.

BACKGROUND OF THE INVENTION

This invention relates to a hydraulic boost device for use in the brake system of an automotive vehicle.

Because of their smaller size and lower weight, hydraulic brake boosters are expected to be used in lieu of vacuum boosters in vehicles having power assisted brakes in the near future. Such a device is disclosed in U.S. patent application Ser. No. 793,923, filed Jan. 16, 1969, owned by the assignee of the present invention and incorporated herein by reference. This unit utilizes the pressurized fluid produced by the vehicle's power steering pump to provide a hydraulic assist to the vehicle operator when the brakes are applied. Although this unit performs quite satisfactorily, assembly of this device is a tedious procedure since the various internal parts must be assembled after they are placed in the booster housing, requiring that access openings be provided through the housing.

SUMMARY OF THE INVENTION

Therefore, an important object of my invention is to facilitate assembly of a hydraulic boost device.

Another important object of my invention is to provide structure that functionally interconnects the boost piston, the operator-operated plunger, and the spool valve in a hydraulic brake booster.

DESCRIPTION OF THE DRAWINGS

FIG. 1 is a fragmentary, longitudinal cross-sectional view of a hydraulic boost device made pursuant to the teachings of my present invention;

FIG. 2 is a cross-sectional view taken along lines 2—2 of FIG. 1;

FIG. 3 is a perspective view of a sub-assembly used in the brake booster illustrated in FIGS. 1 and 2; and FIG. 4 is an exploded view of the sub-assembly illustrated in FIG. 3.

DETAILED DESCRIPTION

Referring now to the drawings, a brake booster 10 includes a housing 12 having an inlet port 14, an outlet port 16, and a return or exhaust port 18. The inlet port 14 is communicated with the high pressure side of a power steering pump 20, and the outlet port 16 is communicated with the inlet port of a power steering gear 22. The exhaust port 18 is communicated to the low pressure side of the pump 20 as is outlet port of the power steering gear 22.

A boost piston 24 is slidable in a longitudinal bore 26 within the housing 12, and one end of the piston 24 is slidably received within a boost chamber 28. Another bore 32 communicates the ports 14, 16, and 18 with each other and with the boost chamber 28. A spool valve 30 is slidable in the bore 32 from a first position established by the engagement of one end 34 of the valve 30 with the abutment 35 to a second position established by the engagement of the other end 36 of the spool valve 30 with the abutment 38 on the other side of the bore. A spring 40 yieldably urges the valve 30 to the right viewing FIG. 1. The valve 30 is further provided with a plurality of radially extending passages 42 and a longitudinally extending passage 44 that communicate pressurized fluid to the boost chamber 28. The outer peripheral surface of the valve 30 is contoured as at 46 and cooperates with corresponding contours in the wall of the bore 26 such that when the valve 30 is in the first position the boost chamber is communicated with the exhaust port 18 and the inlet port 14 is communicated directly to the outlet port 16. As the valve 30 is shifted to the left viewing FIG. 1, communication between the exhaust port 18 and the chamber 28 is terminated and simultaneously a portion of the fluid flowing between the inlet 14 and outlet 16 is directed into the boost chamber 28. Details of the construction and operation of the spool valve 30 are more completely described in copending U.S. application Ser. No. 13,415, filed Feb. 24, 1970, owned by the assignee of the present invention and incorporated herein by reference.

Pressurized fluid in the chamber 28 acts on the end of the piston 24, urging the latter to the left viewing FIG. 1 when the spool valve communicates fluid pressure into the chamber 28. Movement of the piston 24 is transmitted by a push rod 48 to a standard master cylinder (not shown) which is secured to the left side of the housing 12 (viewing FIG. 1). Fluid pressure is developed in the master cylinder by the push rod 48 in the normal manner and is used to activate the vehicle's brakes. A return spring 50 urges the piston 24 to the right viewing FIG. 1 when the pressure in the chamber 28 is reduced.

Actuation of the vehicle's brakes is initiated by movement of an operator-operated control rod 52 that projects into the vehicle operator's compartment and is secured to the usual brake pedal. The rod 52 is operatively connected by mechanism indicated generally at 54 to the spool valve 30 and to the piston 24 so that movement of the rod 52 to the left viewing FIG. 1 moves the piston 24 to the left and simultaneously shifts the valve 30 to a position communicating pressurized fluid into the chamber 28 to assist the operator in applying the vehicle's brakes.

Connecting mechanism 54 includes a bracket 56 which is secured to the end of the piston 24 that is received within the boost chamber 24. Bracket 56 includes a pair of legs 58, 60 extending from the bracket generally parallel to the axis of the piston 24. A pair of levers 62, 64 are each secured to a corresponding leg 58 or 60 by a pivot pin 66 extending through the lower end of the levers. The other ends of the levers 62, 64 are provided with projections 70, 72 that pivot against an abutment surface 74 on the spool valve 30. A generally U-shaped member 76 has a pair of legs 78, 80, each of which is pivotally mounted on one of the levers 62, 64 and a plate 82 interconnecting the legs 78, 80. The plate 82 has an aperture 77 which extends therethrough that slidably receives the control rod 52.

Bracket 56 further includes a pair of arms 84, 86 that extend from the bracket 56 in a direction generally parallel to the axis of the piston 24. A nut 88 is provided with a pair of slots 90, 92 that slidably receive a corresponding one of the arms 84 or 86. The nut 88 is further provided with a threaded opening 94 that threadedly receives a threaded section 96 of the control rod 52. A spring 98 is disposed between a shoulder 100 on the control rod 52 and the U-shaped member 76 to yieldably bias the nut 88 into engagement with the member 76. Finally, a blind bore 102 is provided in the piston 24 that slidably receives the leftwardmost end of the control rod 52.

Constructing the brake booster 10 as described above, facilitates assembly of the device. When the booster 10 is manufactured, the bracket 56 is secured to the end of the piston 24 before the latter is inserted into the housing 12. The U-shaped member 76 is mounted on the levers 62 and 64, and the latter are then installed on the legs 58, 60 by the pivot pin 66. The slots 90, 92 in the nut 88 are then engaged with the arms 84, 86 of the bracket 56. The completed subassembly consisting of the piston 24, bracket 56, levers 62, 64, member 76 and nut 88 is inserted into the bore 26 from the left viewing FIG. 1. The control rod 52 and spring 98 is then inserted into the housing 12 from the right viewing FIG. 1. The control rod 52 is manipulated so that it extends through the aperture 77, and is received in the blind bore 102. The control rod 52 is then rotated so that the threads on the rod are engaged with the threads on the nut. The control rod 52 and the piston 24 are then manipulated to bring the projections 70, 72 on the levers 62, 64 into engagement with the abutment surface 74 on the spool valve 30. An opening 104 is provided in the wall of the housing 12 so that the workman assembling the device can more easily engage the pivots 70, 72 with the valve 30. Opening 104 is later closed by a plug 106.

MODE OF OPERATION

When the vehicle operator depresses the brake pedal, the control rod 52 is forced to the left viewing FIG. 1. The spring 98 normally maintains the nut 88 in engagement with the U-shaped member 76, so that the operator-applied force is transmitted through the levers 62 and 64 to the piston 24, urging the latter to the left to begin applying the vehicle's brakes. The levers 62 and 64 also transmit the operator-applied force to the spool valve 30 to urge the latter to a position admitting pressurized fluid into the chamber 28 which acts against the end of the piston to assist the operator in applying the brakes. If the spool valve 30 should malfunction, requiring a sufficient operator-applied force to compress the spring 98, the nut 88 will slide on the arms 84, 86, and move away from the member 76 so that the end of the rod 52 will engage the end of the blind bore 102. Further movement of the control rod 52 is transmitted directly to the piston 24, thereby providing a manual means for actuating the brakes when the booster 10 malfunctions.

I claim:
1. In a hydraulic boost device:
a housing defining a chamber therewithin;
valve means slidable in said housing for controlling communication of said chamber with a source of pressurized fluid;
a piston slidable in said chamber;
a plunger slidable in said housing operatively connected to said piston;
linkage means operably connecting the piston and the valve means; and
coupling means connecting said plunger to said linkage means;
said coupling means including abutment means on said plunger, a member slidable on said plunger connected to said linkage means and resilient means urging said member into engagement with the abutment means.
2. The invention of claim 1; and
a bracket secured to the piston having a leg projecting axially from said piston;
said linkage means being pivotally connected to said leg.
3. The invention of claim 1:
said member including a plate pivotally secured to said linkage means having an aperture slidably receiving said plunger.
4. The invention of claim 2:
said linkage means including a pair of levers;
each of said levers pivotally engaging said leg and said valve means;
said member including a plate and a pair of legs extending from said plate to present a generally U-shaped device;
each of said legs being pivotally connected to a corresponding lever;
said plate having an aperture extending therethrough slidably receiving said plunger.
5. The invention of claim 4; and
arm means extending from said piston;
said arm means slidably supporting said abutment means.
6. The invention of claim 5:
said plunger being stepped to present a shoulder facing toward said piston;
said abutment means engaging said shoulder and being threadedly secured to said plunger.

References Cited

UNITED STATES PATENTS 2,957,454  10/1960  Stelzer _____ 91—377

FOREIGN PATENTS 1,105,351  3/1968  Great Britain _____ 91—391

PAUL E. MASLOUSKY, Primary Examiner

U.S. Cl. X.R.
91—434, 469